United States Patent
Bisror et al.

(10) Patent No.: US 8,783,761 B2
(45) Date of Patent: Jul. 22, 2014

(54) CHASSIS WITH RAISING BOX STRUCTURE TO ANCHOR PASSENGER SEATS

(75) Inventors: Olivier Bisror, Le Plessis Robinson (FR); Thomas Mauduit, Voisins le Bretonneux (FR); Pascal Tabuteau, Montigny le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/811,750

(22) PCT Filed: Jul. 12, 2011

(86) PCT No.: PCT/FR2011/051653
§ 371 (c)(1),
(2), (4) Date: Mar. 21, 2013

(87) PCT Pub. No.: WO2012/010775
PCT Pub. Date: Jan. 26, 2012

(65) Prior Publication Data
US 2013/0175826 A1    Jul. 11, 2013

(30) Foreign Application Priority Data
Jul. 23, 2010 (FR) .................................... 10 56046

(51) Int. Cl.
*B60J 7/00* (2006.01)
(52) U.S. Cl.
USPC ............................................................. 296/204
(58) Field of Classification Search
USPC ................... 296/204, 205, 203.04, 203.01
See application file for complete search history.

(56) References Cited

U.S. PATENT DOCUMENTS

| 4,369,981 A |   | 1/1983  | Chiba et al.             |
|-------------|---|---------|--------------------------|
| 4,557,519 A | * | 12/1985 | Matsuura ........... 296/204 |
| 6,088,918 A | * | 7/2000  | Corporon et al. ...... 29/897.2 |

(Continued)

FOREIGN PATENT DOCUMENTS

| EP | 0 035 739 | 9/1981  |
|----|-----------|---------|
| EP | 1 710 153 | 10/2006 |

(Continued)

OTHER PUBLICATIONS

French Search Report Issued Mar. 31, 2011 in French Patent Application 1056046 Filed Jul. 23, 2010.

(Continued)

*Primary Examiner* — Kiran B Patel
(74) *Attorney, Agent, or Firm* — Oblon, Spivak, McClelland, Maier & Neustadt, L.L.P.

(57) ABSTRACT

A motor vehicle chassis including a rear central cross member, a hollow beam positioned over the rear central cross member along this rear central cross member, and a floor seat-cushion support part including rear seat fittings, supported at the rear by the hollow beam positioned under the seat-cushion support part. The beam includes a rear raiser including a horizontal plate fixed to the rear central cross member and further includes a blanking sheet fixed to the horizontal plate of the rear raiser and including at least one anchoring reinforcement assembled on the inside of the hollow beam. The reinforcement, which forms a hollow box section, connects the rear raiser and the blanking sheet, an upper face of the anchoring reinforcement supports a connecting piece, the connecting piece also being assembled, on the outside of the hollow beam, with the rear raiser.

10 Claims, 4 Drawing Sheets

(56) References Cited

U.S. PATENT DOCUMENTS

Figure 1:
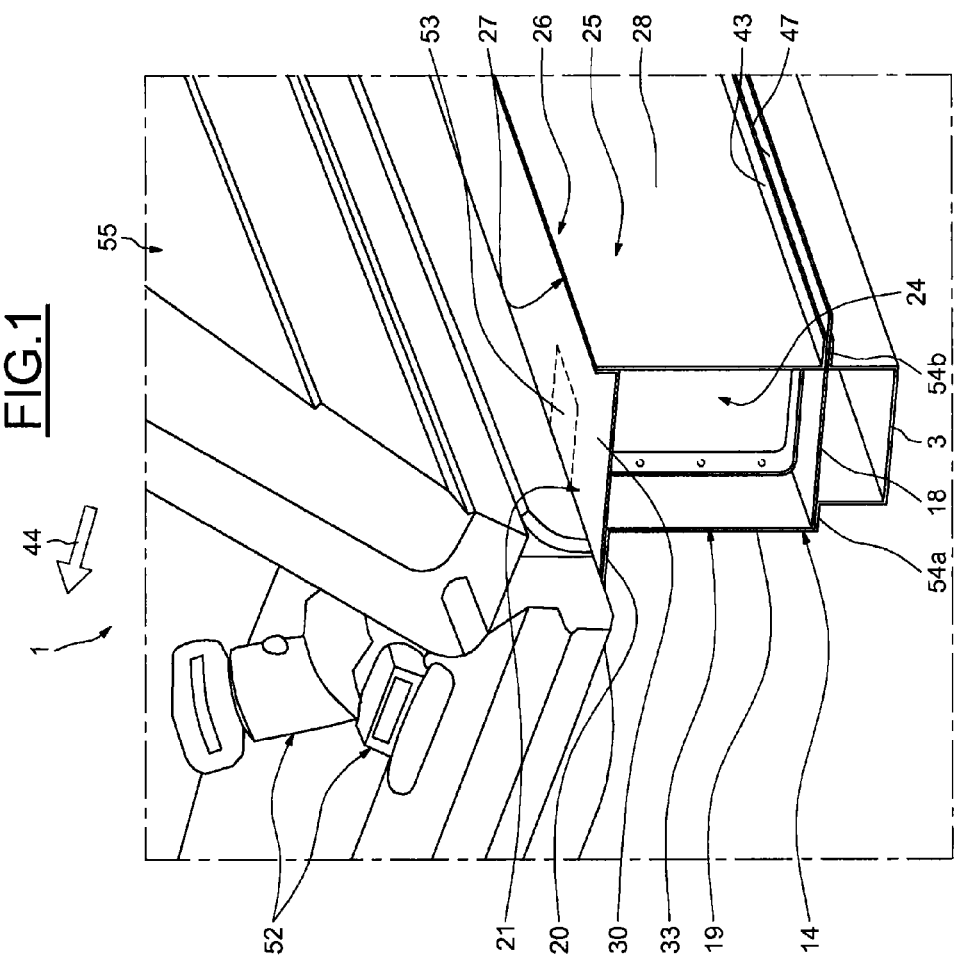

| | | | |
|---|---|---|---|
| 7,614,684 B2 * | 11/2009 | Yasuhara et al. | 296/187.09 |
| 7,677,651 B2 * | 3/2010 | Yamaguchi et al. | 296/203.04 |
| 8,567,543 B2 * | 10/2013 | Kubota et al. | 180/68.5 |
| 2004/0195865 A1 * | 10/2004 | Tomita | 296/203.04 |
| 2006/0097533 A1 * | 5/2006 | Watanabe et al. | 296/30 |
| 2007/0246929 A1 * | 10/2007 | Isayama et al. | 280/834 |
| 2010/0327628 A1 * | 12/2010 | Taguchi | 296/193.07 |
| 2013/0180790 A1 * | 7/2013 | Bisror et al. | 180/68.5 |
| 2013/0181483 A1 * | 7/2013 | Tabuteau et al. | 296/193.02 |

FOREIGN PATENT DOCUMENTS

| | | |
|---|---|---|
| JP | 55127263 | 10/1980 |
| JP | 7156826 | 6/1995 |
| JP | 8169245 | 7/1996 |
| WO | 2009098993 | 8/2009 |

OTHER PUBLICATIONS

International Search Report Issued Oct. 17, 2011 in PCT/FR11/51653 Filed Jul. 12, 2011.

U.S. Appl. No. 13/811,761, filed Mar. 12, 2013, Bisror, et al.
U.S. Appl. No. 13/811,777, filed Apr. 4, 2013, Tabuteau, et al.
U.S. Appl. No. 13/811,762, filed Apr. 2, 2013, Tabuteau, et al.
U.S. Appl. No. 13/811,808, filed Apr. 4, 2013, Mauduit, et al.

* cited by examiner

ND SS WITH RAISING BOX STRUCTURE
TO ANCHOR PASSENGER SEATS

The invention relates to the field of motor vehicle chassis, in particular electrically-driven or hybrid vehicles. In order to provide sufficient autonomy to the electrically-driven or hybrid vehicles, accumulator batteries have to be fitted. The volume of said batteries is substantially greater than that occupied by a conventional energy storage tank, such as for example a fuel tank.

One solution consists in making use of a defined volume below the passenger seats, by modifying the profile of the floor so as to isolate said volume from the passenger compartment. The passenger seats thus directly rest on a raised area of the floor. The height of the seats is able to be the same as the height of the seats in vehicles in the same range, designed to be driven by an internal combustion engine, or may be higher.

The patent application JP 07 156 826 thus discloses a chassis structure for an electrically-driven motor vehicle, in which a volume below the front and rear passenger seats is reserved for the battery by separating said volume from the passenger compartment. Vertical raising plates are positioned to the front and to the rear of the seats. A raised floor seat-cushion area extends from front to rear between said vertical raising plates, and extends laterally between the lateral raising supports fixed to the lateral side portions of the bodywork.

Such a structure is not applicable to a three-door vehicle since it is necessary for the rear passenger seats to be bounded by fixed bodywork side portions, to which the lateral raising supports are assembled.

Moreover, where it is desired to provide the same vehicle as an electrically-driven model and as a model driven by an internal combustion engine, the line of the welding points, which make it possible to assemble the floor elements to the longitudinal members of the vehicle, may not have the same geometry for the electric vehicle and for the vehicle driven by an internal combustion engine. Thus, for the production of the two vehicles, it is necessary to put in position two separate welding lines, which increases both the development and production costs.

Finally, by raising the seat-cushion area of the seats, it is necessary to displace the rear seat fittings and the anchoring point of the associated seat belts. Said fittings and said anchoring points are conventionally attached to a rear supporting crossmember. When raising the seat cushions, the tendency is thus to displace the fittings and the anchoring points to an attached raising structure which, in order to respect maximum weight limitations, is generally less rigid than the rear crossmember.

The object of the invention is to propose a chassis geometry for an electric vehicle or for a further vehicle requiring an increased volume of the energy storage tank, which makes it possible to produce at the same time electrically-driven vehicles and vehicles driven by an internal combustion engine, using a large number of components and common production methods.

The object of the invention is also to propose a chassis structure having a raised floor, making it possible to attach the seat fittings and the anchoring points of the seat belts in a secure manner.

To this end, a motor vehicle chassis comprises a rear central crossmember. It also comprises a floor seat-cushion support part provided with rear seat fittings and supported to the rear by the rear central crossmember. The chassis further comprises a hollow beam arranged above the rear central crossmember along said rear central crossmember, said beam comprising a rear raising part. The rear raising part may comprise a vertical raising plate and a horizontal plate fixed to the rear central crossmember, the vertical plate and the horizontal plate being, for example, produced from the same metal sheet, folded along an edge common to the two plates. The hollow beam comprises a blanking sheet fixed in turn to the horizontal plate, and comprises at least one anchoring reinforcement assembled inside the hollow beam, the reinforcement forming a hollow box structure and connecting the rear raising part and the blanking sheet. An upper face of the anchoring reinforcement supports a mounting part, said mounting part also being able to be assembled, on the outside of the hollow beam, to the rear raising part, for example to the vertical plate of the rear raising part.

Preferably, the anchoring reinforcement connects a vertical plate of the rear raising part and a part of the blanking sheet, which in turn is also vertical. The anchoring reinforcement may also be fixed to the horizontal plate of the rear raising part.

According to a preferred embodiment, one face of the anchoring reinforcement is made flush in the vicinity of the seat-cushion support part of the floor.

Advantageously, the hollow box structure is delimited by a face forming part of the blanking sheet, by two faces forming part of the rear raising part and by three faces formed by a sheet folded in a U-shape assembled inside the hollow beam.

A rear seat fitting may be anchored to a mounting part fixed to the anchoring reinforcement.

Preferably, the chassis comprises at least two anchoring reinforcements and anchoring parts for seat belts are anchored to the mounting parts.

The distance between the centers of the two box structures may range, for example, between 30 cm and 60 cm.

According to a preferred embodiment, each mounting part comprises a hollow volume assembled to the external face of the vertical plate of the rear raising part and is extended by a planar bearing surface assembled to a rear part of the seat-cushion support in the region of the anchoring reinforcement. (The external face denotes in this case the external face of the hollow beam).

The blanking sheet comprises, for example, a vertical surface parallel to the vertical plate of the rear raising part and may also comprise two lateral vertical surfaces folded back from said vertical surface and assembled to the rear vertical raising plate, along the sides thereof.

According to a preferred embodiment, the chassis comprises two longitudinal members connected by the rear central crossmember and covered at the front of the crossmember by lateral floor reinforcements. A transverse reinforcement and two lateral raising parts are fixed to said lateral reinforcements. The seat-cushion support part of the floor is fixed above the two lateral raising parts, the aforementioned rear raising part and the transverse reinforcement so as to create a housing for an energy storage tank below the seat-cushion support part of the floor.

Advantageously a strip-shaped portion of the horizontal plate of the rear raising part protrudes beyond the rear of the vehicle relative to the blanking sheet and relative to the rear central crossmember. Thus, it is possible to fix a rear floor plate to the rear of the two longitudinal members and to the rear edge of the rear raising part by welding just two thicknesses of metal sheet.

Advantageously, the rear raising part and the transverse reinforcement extend solely between the internal sides of the two lateral floor reinforcements. The walls defining the volume dedicated to the energy storage tank are thus independent of the external bodywork and the apertures of the vehicle.

Figure 2:
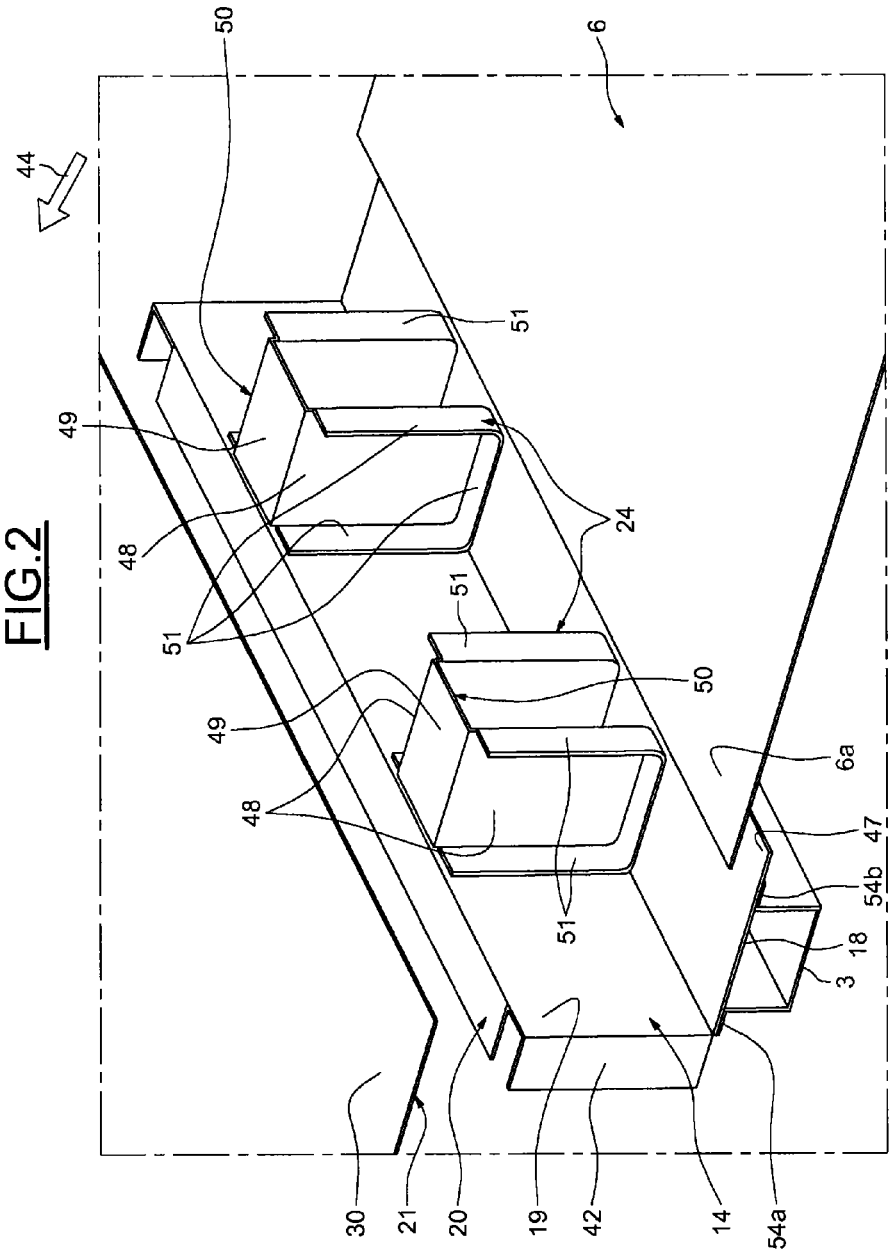
Figure 3:
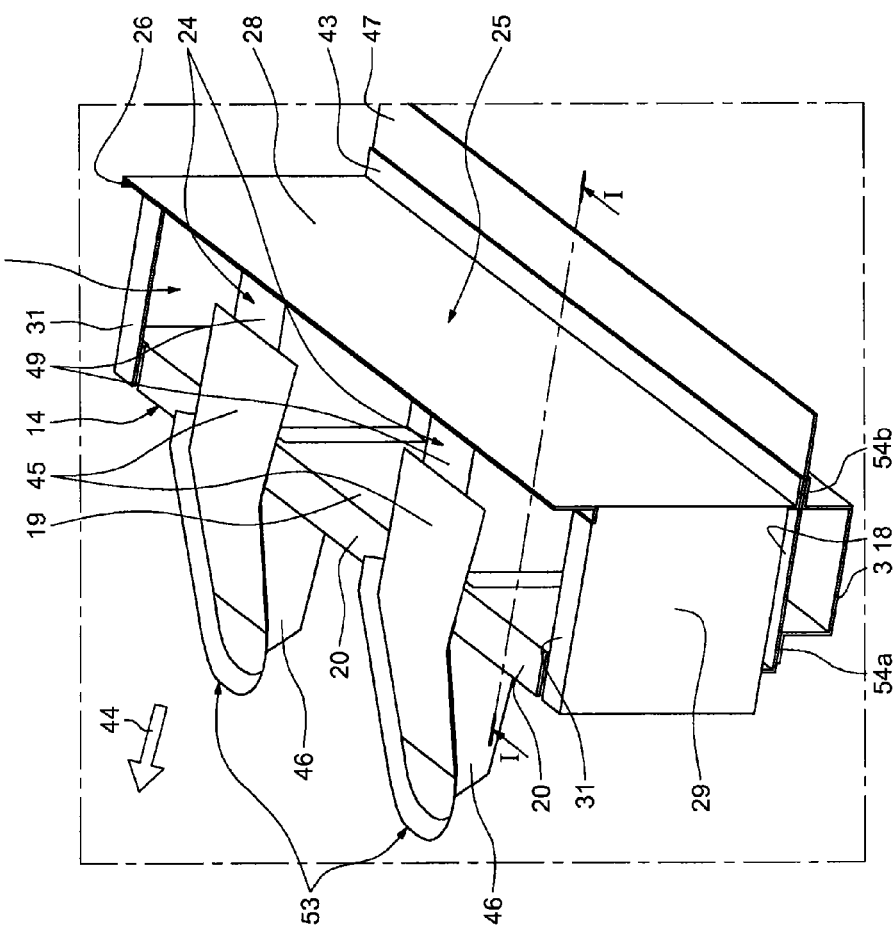
Figure 4:
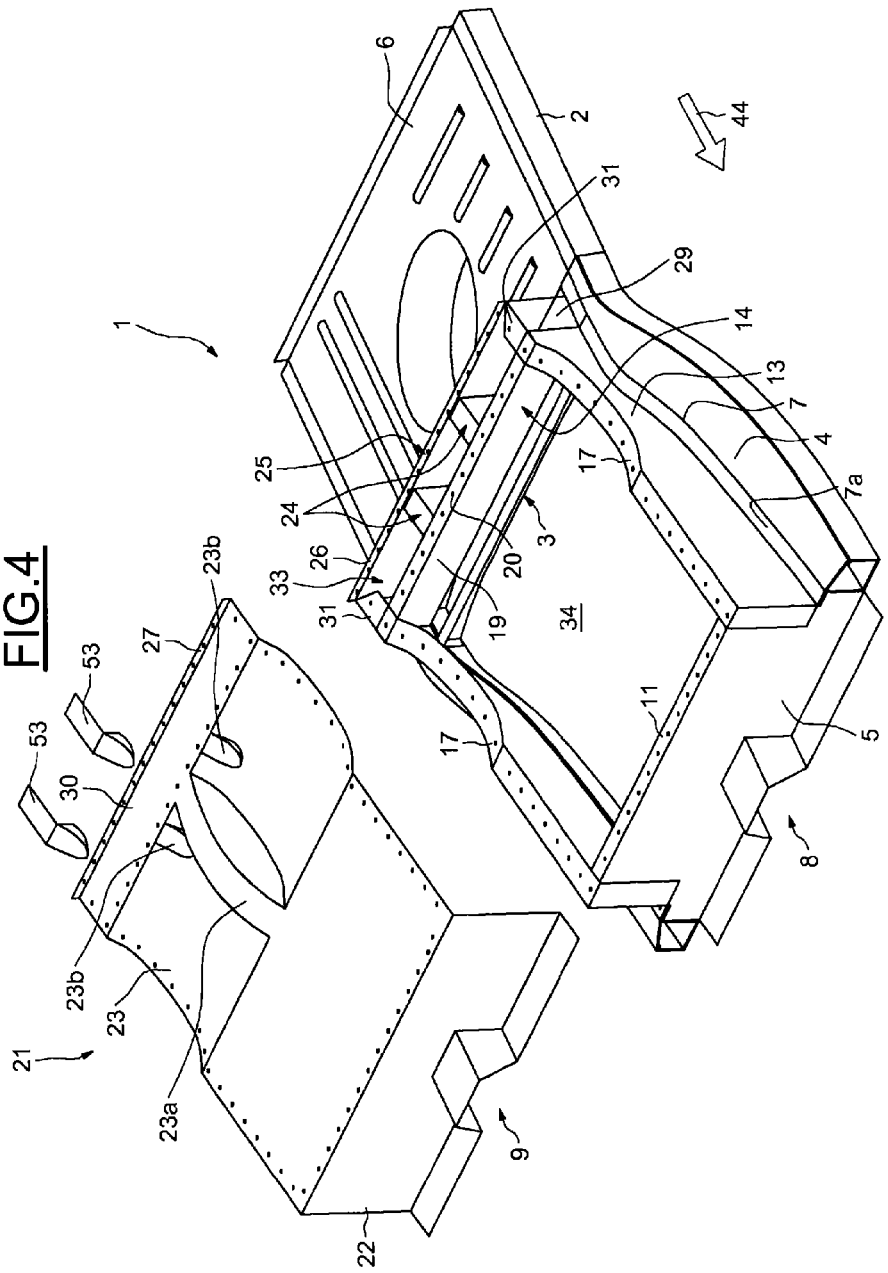

The present invention will be understood more clearly by reading the detailed description of several embodiments taken by way of non-limiting example, and illustrated by the accompanying drawings, in which:

FIG. 1 is a schematic perspective view in partial section along I-I of FIG. 3 of a chassis portion according to the invention, FIG. 2 is a schematic perspective view of several constituent elements of the chassis of FIG. 1, FIG. 3 is a schematic perspective view of several further constituent elements of the chassis of FIG. 1, FIG. 4 is an exploded perspective view of a rear preassembled part of the chassis of FIGS. 1 to 3.

It will be noted that the respective proportions of the schematic views of the different figures do not necessarily correspond, said schematic views solely having the purpose of illustrating certain features of the invention.

The arrow 44 on each occasion in FIGS. 1 to 4 indicates the forward direction of the vehicle (not shown).

As illustrated in FIG. 1, a chassis 1 comprises a floor seat-cushion support part 21 to which a bench 55 for a rear passenger seat is assembled. To the rear of the seat bench 55, the seat-cushion support part 21 is supported by a rear central crossmember 3 connecting two longitudinal members 2 of the vehicle (not shown). The rear central crossmember 3 is a beam of U-shaped section, the U-shaped section being open at the top and laterally bounded by two horizontal edges 54a and 54b. The depth of the U-shaped section may be uniform or variable but such that its two edges 54a and 54b remain planar.

According to the invention, a hollow beam 33 is arranged above the rear crossmember 3, to which it is assembled by welding along the edges 54a, 54b. Said hollow beam 33 supports a rear part 30 of the seat-cushion support part 21 of the floor. The walls of the hollow beam 33 consist of a rear raising part 14, a blanking sheet 25 and the rear part 30. Said three sheet parts are welded together along welding lines transverse to the vehicle. A first sheet is the horizontal rear part 30 of the seat-cushion support part 21. The two other sheets, assembled to the first, are:

a rear raising part 14, consisting of a metal sheet folded so as to form a vertical plate 19 placed substantially above the horizontal edge 54a of the rear crossmember 3, and a horizontal plate 18 welded to the rear crossmember 3 along the edges 54a and 54b; the rear raising part 14 comprises an upper horizontal edge 20, along which it is assembled by welding below the rear part 30 of the seat-cushion support area 21, spaced apart from the rear end of said seat-cushion support area;

a blanking sheet 25 comprising a vertical surface 28, arranged in parallel to the plate 19, substantially above the edge 54b of the rear crossmember 3 and assembled by welding along its upper edge 26 to a vertical end edge 27 of the rear part 30 of the seat-cushion support part 21. The blanking sheet 25 comprises a lower horizontal edge 43 turned outward from the hollow beam 33, i.e. toward the rear of the vehicle. Via the edge 43, the blanking sheet 25 is assembled by welding in three thicknesses, both to the horizontal plate 18 of the rear raising part 14 and to the edge 54b of the rear crossmember 3.

The upper face of the hollow beam 33 is closed by the horizontal rear part 30 of the seat-cushion support part 21. Said rear part 30 is assembled by at least one welding line along the edge 20 of the rear raising sheet 14 and by a parallel welding line along the end edge 27 of the rear part 30.

The horizontal plate 18 of the rear raising part 14 protrudes to the rear of the vehicle relative to the edge 43 of the blanking sheet 25 and protrudes relative to the edge 54b of the rear central crossmember 3. A rear strip 47 of the horizontal plate 18 is thus available to be superposed with a front edge of a rear floor plate 6 (as seen in FIG. 2) and to be assembled by welding to said rear floor plate 6.

Two anchoring reinforcements 24 (only one being shown in FIG. 1) are assembled inside the hollow beam 33 in the form of a box structure, the vertical walls 48 thereof each extending over the entire height and over the entire width (i.e. in the front-to-rear direction of the vehicle) of the internal cross section of the hollow beam 33. In the region of the upper face 49 of each reinforcement 24 is assembled a mounting part 53 visible in FIGS. 1 and 3, to which seat fittings (not shown) and anchoring parts (not shown) of seat belts 52 are assembled. Thus a rigid connection is obtained of the mounting parts 53, capable of withstanding the forces able to be exerted on the parts 53 in the event of a front-end or rear-end collision of the vehicle, said forces being transmitted to the rear central crossmember 3 via said rigid assembly.

Preferably, for a vehicle having three rear passenger seats, the hollow beam 33 may comprise two anchoring reinforcements 24, so as to be able to attach to each of said reinforcements the anchoring parts of the seat belts of a central seat and a side seat. It goes without saying that a different number of anchoring reinforcements could be envisaged, for example a single central reinforcement, in particular in the case of a vehicle only providing two rear passenger seats, or three reinforcements or four reinforcements, some of the reinforcements thus not being used to fix the seat belt anchoring parts.

FIG. 2 is a perspective view of a front part of the hollow beam 33, assembled to the rear central crossmember 3. Elements common to FIG. 1 are seen in FIG. 2, the same elements thus being denoted by the same reference numerals. The rear raising sheet 14 may be seen in particular in FIG. 2, said rear raising sheet comprising the vertical plate 19 and the horizontal plate 18 assembled to the rear central crossmember 3 along the edges 54a and 54b of the crossmember 3.

It should be noted that the assembly between the rear raising part 14 and the rear central crossmember 3, in addition to the assemblies between the other sheets of the chassis, may be preferably carried out by spot welding, or following a continuous line, or following any other assembly procedure, for example by adhesive bonding or riveting.

The vertical plate 19 is extended along its upper edge by the horizontal edge 20 making it possible to assemble it by welding to the rear part 30 of the seat-cushion support part 21. The vertical plate 19 is also extended along its vertical edges by two edges 42 folded back toward the front of the vehicle, so as to be located in a plane parallel to the longitudinal axis of the vehicle.

The horizontal plate 18 protrudes beyond the edge 54b of the rear central crossmember 3. Thus, it is possible to superpose a front end 6a of the rear floor plate 6 at the rear of the horizontal plate 18, without this interfering with the thickness of the edge 54b of the rear central crossmember 3. A double-thickness weld is thus possible between the horizontal plate 18 and the rear floor plate 6.

The two box structures for the anchoring reinforcements 24 are assembled within the dihedron formed by the vertical plate 19 and the horizontal plate 18, the mutual spacing thereof substantially corresponding to the spacing between two anchoring points for seat belts for rear passengers of the vehicle. Each anchoring reinforcement 24 is obtained by assembling a sheet 50 folded back so as to comprise three flaps arranged in a U-shape, inside the dihedron formed by the rear raising part 14. The sheet 50 is positioned so that the bottom face 49 of the U-shape connects the upper edges of the vertical plate 19 of the rear raising part 14 and the vertical surface 28 of the blanking sheet 25 (FIGS. 1 and 3).

The ends of the sheet 50 opposing the face 49 of the U-shape are assembled to the horizontal plate 18 of the rear raising part 14. The four vertical edges of the vertical walls 48 of the U-shape are assembled either to the vertical plate 19 or to the vertical surface 28 visible in FIGS. 1 and 3. Thus anchoring reinforcements 24 are obtained in the form of box structures consisting of three faces of a sheet 50, a vertical plate portion 19 of the rear raising part 14, a horizontal plate portion 18 of the rear raising part and a vertical surface portion 28 of the blanking sheet 25 (visible in FIGS. 1 and 3). The reinforcing box structures 24, in the form of a rigid parallelepiped shape, effectively resist torsional deformation both in a horizontal plane and in any vertical plane.

The assembly of the vertical walls 48 of the sheets 50 may be carried out by means of assembly strips 51 perpendicular to the walls 48, obtained either by folding or by crimping the sheet 50. A preferred embodiment consists in obtaining assembly strips 51 by crimping the sheet 50 so that each wall 48 is extended along three consecutive sides by the same assembly strip 51, which further improves the rigidity of the final assembly.

FIG. 3 is a further view in perspective of the hollow beam 33 of FIGS. 1 and 2, before assembly of the seat-cushion support area 21. FIG. 3 makes it possible to see more accurately the mounting parts 53 of FIG. 1, in addition to certain details of the blanking sheet 25. It will be noted that the mounting parts 53 are, in reality, attached to the seat-cushion support part 21, not shown in FIG. 3. FIG. 3 thus enables just the positions of said mounting parts 53 to be visualized relative to the box structures of the anchoring reinforcements 24. Elements common to FIGS. 1 and 2 are found in FIG. 3, the same elements thus being denoted by the same reference numerals. FIG. 3 shows, in particular, the arrangement between the rear raising part 14, the anchoring reinforcements 24 and the rear blanking sheet 25 in addition to the position of the mounting parts 53.

The blanking sheet 25 is welded by its vertical surface 28 to the assembly strips 51 of the reinforcements 24 (FIG. 2). The vertical surface 28 has a lower horizontal edge 43 which is assembled by welding in three thicknesses to the horizontal plate 18 of the rear raising part 14 and to the edge 54b of the rear central crossmember 3, so as to permit a strip 47 of the horizontal plate 18 to protrude to the rear relative to the two further thicknesses of the sheets to which it is assembled. Lateral vertical surfaces 29, extending the vertical surface 28 of the blanking sheet but folded back in a plane parallel to the longitudinal axis of the vehicle, close the hollow beam 33 on the lateral sides thereof. Said surfaces 29 are assembled to the vertical edges 42 of the rear raising part 14 (visible in FIG. 2).

The upper edges of the vertical surfaces 29 and 28 of the blanking sheet 25 respectively have edges 31 and 26 serving as welding strips and which may either be folded back horizontally or remain vertical. Preferably, the lateral edges 31 are folded back horizontally so as to be welded below the seat-cushion support part 21 and the upper edge 26 remains vertical so as to be welded to the rear end of the seat-cushion support part 21. Other configurations of edges, for assembly by welding, may naturally also be envisaged. For example, the lateral edges 31 may be replaced by vertical strips extending downwardly from the sides of the rear part 30 of the seat-cushion support part 21 visible in FIG. 4.

A mounting part 53 is assembled to the seat-cushion support part 21 in the region of each of the reinforcements 24. Each mounting part 53 comprises an upper plate forming a planar part 45 placed in the region of an upper face 49 of one of the reinforcements 24 above the horizontal edge 20 of the rear raising part 14. Each upper plate 45 is fixed to a hollow body 46 arranged therebelow, welded to the front face of the vertical plate 19 of the rear raising part 14.

Each mounting part 53 bears against the upper face of the rear part 30 of the seat-cushion support part 21 (see FIG. 4) which is assembled to the top of the hollow beam 33.

The seat fittings and the anchoring parts of the seat belts 52 (visible in FIG. 1) are assembled to a proportion of the mounting parts 53 located in front of the hollow beam 33. The anchoring reinforcements 24 serve to stiffen the hollow beam 33 in order to improve the rigidity of the seat-cushion support part 21. Said anchoring reinforcements 24 also provide a particularly strong attachment point for anchoring seat belts, or for the assembly of mounting brackets for passenger seats.

The mounting parts 53 displaced to the front of the hollow beam 33 make it possible to arrange anchoring points sufficiently far forward along the longitudinal axis of the vehicle, relative to the seat bench 55 (visible in FIG. 1). The rigid assembly of the hollow bodies 46 and the hollow beam 33 further improves the overall rigidity of the hollow beam 33.

FIG. 4 is an exploded perspective view of a rear central part of a chassis according to the invention. Elements common to the preceding figures are seen in FIG. 4, the same elements thus being denoted by the same reference numerals. As illustrated in FIG. 4, the chassis 1 comprises two longitudinal members 2 connected by the rear central crossmember 3 to which the hollow beam 33 is assembled. The rear floor plate 6 is assembled to the upper part of the longitudinal members 2 located to the rear of the crossmember 3. Said rear floor plate 6 is also assembled to the hollow beam 33 so as to come in line with the base of said beam 33, in the vicinity of the edge 54b of the beam 3 (see FIG. 2). To the front of the rear central crossmember 3, the longitudinal members 2 each support a lateral floor reinforcement 4 on their upper part. The lateral floor reinforcements 4 each consist of a sheet crimped in a central direction close to the horizontal, extending between an external edge and an internal edge of the corresponding longitudinal member 4. The external edge of each lateral reinforcement 4 is assembled to the external edge of the corresponding longitudinal member. The internal side 7 of each lateral floor reinforcement 4 is assembled, by a weld line connecting three thicknesses of sheet, to the internal edge of the longitudinal member, and to a lower edge of a lateral raising part 13 consisting of a sheet portion in a substantially vertical direction.

A transverse reinforcement 5 connects the lateral floor reinforcements 4 at the front and spaced apart from the rear central crossmember 3. The transverse reinforcement 5 is in the form of a crimped sheet, in a substantially vertical direction and transverse to the axis of the vehicle. A passage 8 is formed in the lower central part in said transverse reinforcement 5. The height of the transverse reinforcement 5 is such that the upper edge 11 of the transverse reinforcement 5 may be located, in the assembled position of the chassis, substantially at the same height as the open upper face of the hollow beam 33. The transverse reinforcement 5 and the hollow beam 33 are connected along each lateral floor reinforcement 4 by lateral raising parts 13 arranged on each side.

The upper edge 17 of each lateral raising part 13 joins, at each of its ends, the upper edge 11 of the transverse reinforcement 5 and the upper face of the hollow beam 33. Between said ends, the upper edge 17 of each lateral raising part 13 has a slight concavity. The transverse reinforcement 5, the lateral raising parts 13 and the vertical plate 19 of the rear raising part 14 thus delimit a housing 34 which may be closed at the top by the seat-cushion support part 21 of the floor. The seat-cushion support part 21 of the floor is assembled by its periphery to the upper edge 11 of the transverse reinforcement 5 and to the upper edges 17 of the lateral raising parts 13, and by the periphery of its rear part 30 provided with mounting parts 53, to the edges 20, 26 and 31 of the hollow beam 33 which form welding strips. As the housing 34 is thus isolated from the passenger compartment, it is available for receiving an energy storage tank. The seat-cushion support part 21 of the floor comprises, apart from the rear part 30 closing the hollow beam 33 and a cover-forming portion 23 closing the upper part of the housing 34, a front plate 22 which is folded back downwards from the cover 23. The front plate 22 is capable of covering the transverse reinforcement 5 and comprises a passage area 9 designed to nest on the passage 8 of the transverse reinforcement 5. The cover portion 23 has an upwardly oriented concavity, with an axial reinforcement beam 23a. Planar areas 23b are provided on the cover portion 23 in the vicinity of the rear part 30, for the assembly of the mounting parts 53 shown in the exploded position in FIG. 4 to the seat-cushion support part 21.

By the arrangement disclosed in FIGS. 1 to 4, a housing 34 is made available below the rear passenger seats in which an energy storage tank such as a set of accumulator batteries or a pressurized fuel tank may be arranged. The proposed structure makes it possible to obtain a structure supporting the seats, independent of the lateral edges of the bodywork, and thus is suitable both for a three-door vehicle and for a five-door vehicle.

The association of the hollow beam 33 with the rear central crossmember 3 which is assembled there in a rigid manner makes it possible to obtain a transverse beam structure having an increased modulus of flexibility, with low material consumption. The addition of reinforcing box structures 24 improves the torsional stiffness of the beam and, without consuming additional material, contributes to providing particularly strong anchoring points for the seat attachment fittings and for the anchoring parts of the seat belts.

The invention claimed is:

1. A motor vehicle chassis comprising:
   a rear central crossmember;
   a hollow beam arranged above the rear central crossmember along the rear central crossmember; and
   a floor seat-cushion support part including rear seat fittings, supported to a rear by the hollow beam positioned under the seat-cushion support part;
   the beam comprising a rear raising part comprising a horizontal plate fixed to the rear central crossmember;
   the beam further comprising a blanking sheet fixed to the horizontal plate of the rear raising part and comprising at least one anchoring reinforcement assembled inside the hollow beam, the reinforcement forming a hollow box structure connecting the rear raising part and the blanking sheet, an upper face of the anchoring reinforcement supporting a mounting part, the mounting part being also assembled on an outside of the hollow beam to the rear raising part.

2. The motor vehicle chassis as claimed in claim 1, wherein the upper face of the anchoring reinforcement is made flush in a vicinity of the seat-cushion support part of a floor.

3. The motor vehicle chassis as claimed in claim 2, wherein the hollow beam is delimited by a face forming part of the blanking sheet, by two faces forming part of the rear raising part, and by three faces formed by a sheet folded in a U-shape assembled inside the hollow beam.

4. The motor vehicle chassis as claimed in claim 1, wherein a rear seat fitting is anchored to a mounting part fixed to the anchoring reinforcement.

5. The motor vehicle chassis as claimed in claim 4, comprising at least two anchoring reinforcements, and wherein anchoring parts for seat belts are anchored to the mounting parts.

6. The motor vehicle chassis as claimed in claim 1, each mounting part comprising a hollow volume assembled to an external face of the rear raising part and extended by a planar bearing surface assembled to a rear part of the seat-cushion support part in a region of the anchoring reinforcement.

7. The motor vehicle chassis as claimed in claim 1, wherein the blanking sheet comprises a vertical surface parallel to a vertical plate of the rear raising part, and two lateral vertical surfaces folded back from the vertical surface and assembled to the vertical plate of the rear raising part, along sides thereof.

8. The motor vehicle chassis as claimed in claim 1, comprising two longitudinal members connected by the rear central crossmember and covered at a front of the crossmember by lateral floor reinforcements, a transverse reinforcement being fixed to the lateral reinforcements and two lateral raising parts being fixed to the lateral reinforcements, the seat-cushion support part of a floor being fixed above the two lateral raising parts, the rear raising part and the transverse reinforcement so as to create a housing for an energy storage tank below the seat-cushion support part of the floor.

9. The motor vehicle chassis as claimed in claim 8, wherein a strip of the horizontal plate of the rear raising part protrudes beyond a rear of the vehicle relative to the blanking sheet and relative to the rear central crossmember.

10. The motor vehicle chassis as claimed in claim 9, wherein the rear raising part and the transverse reinforcement extend solely between internal sides of the two lateral floor reinforcements.

\* \* \* \* \*